US009600927B1

(12) United States Patent
Poursohi et al.

(10) Patent No.: US 9,600,927 B1
(45) Date of Patent: Mar. 21, 2017

(54) SYSTEMS AND METHODS FOR CAPTURING ASPECTS OF OBJECTS USING IMAGES AND SHADOWING

(71) Applicant: Google Inc., Mountain View, CA (US)

(72) Inventors: Arshan Poursohi, Berkeley, CA (US); Thor Lewis, San Francisco, CA (US); Anthony Gerald Francis, Jr., San Jose, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 14/055,169

(22) Filed: Oct. 16, 2013

Related U.S. Application Data (60) Provisional application No. 61/716,610, filed on Oct. 21, 2012.

(51) Int. Cl.
*G06T 15/60* (2006.01)
*G06T 17/00* (2006.01)

(52) U.S. Cl.
CPC .............. *G06T 15/60* (2013.01); *G06T 17/00* (2013.01)

(58) Field of Classification Search
None
See application file for complete search history.

(56) References Cited

U.S. PATENT DOCUMENTS

2002/0145103 A1* 10/2002 Bernardini et al. ........ 250/208.1
2008/0069445 A1* 3/2008 Weber .................. G06T 7/0083
382/181

2011/0211729 A1* 9/2011 Ramalingam ...... G06K 9/00201
382/103
2012/0176478 A1 7/2012 Wang et al.
2012/0177283 A1 7/2012 Wang et al.

OTHER PUBLICATIONS

Daum, On 3-D Surface Reconstruction Using Shape from Shadows, 1998, IEEE Conference on Computer Vision and Pattern Recognition (CVPR).*
Forbes, Using Silhouette Consistency Constraints to Build 3D Models, 2003, In Proceedings of the Fourteenth Annual Symposium of the Pattern Recognition Association of South Africa (PRASA 2003).*

(Continued)

*Primary Examiner* — Jacinta M Crawford
*Assistant Examiner* — Phuc Doan
(74) *Attorney, Agent, or Firm* — McDonnell Boehnen Hulbert & Berghoff LLP (57) ABSTRACT

Methods and systems for determining the shape of an object based on shadows cast by the object are described. An example method may include receiving a plurality of images of an object casting a shadow. Each image may include a shadow cast by the object as the object is illuminated by a light source that moves over a plurality of positions. The method may further include determining, by a computing device, respectively for each image of the plurality of images a two-dimensional (2D) silhouette of the object and a respective position of the light source relative to the object. According to the method, a three-dimensional (3D) object data model of the object may be generated by the computing device based on the 2D silhouette of the object and the respective position of the light source relative to the object for each image of the plurality of images.

9 Claims, 7 Drawing Sheets

(56) References Cited

OTHER PUBLICATIONS

Mitra, Shadow Art, Proceedings of ACM SIGGRAPH Asia 2009 TOG vol. 28 Issue 5, Dec. 2009 Article No. 156.*
Junejo, GPS coordinates estimation and camera calibration from solar shadows, Computer Vision and Image Understanding 114 (2010) 991-1003.*
Cao, Camera calibration and light source orientation from solar shadows, Computer Vision and Image Understanding 105 (2007) 60-72.*
Balan, Shining a Light on Human Pose: On Shadows, Shading and the Estimation of Pose and Shape, IEEE 2007, pp. 1-8.*
Dickey, Recovering shape from shadows in synthetic aperture radar imagery, Proc. of SPIE vol. 6947, 694707, (2008), pp. 694707-1 thru 694707-12.*
Keith Forbes et al., "Using Silhouette Consistency Constraints to Build 3D Models", Proceedings of the Fourteenth Annual Symposium of the Pattern Recognition Association of South Africa, 2003.
Bo Hu et al., "The geometry of point light source from shadows", Technical Report 810, Jun. 2004.
Huei-Yung Lin et al., "3D reconstruction by combining shape from silhouette with stereo", Proceedings of the 19th International Conference on Pattern Recognition, 2008.

* cited by examiner

Computer Program Product 700

Signal Bearing Medium 701

Program Instructions 702

- receiving a plurality of images of an object casting a shadow, each respective image of the plurality of images corresponding to a respective time of a period of time during which a light source illuminates the object object over a plurality of positions, wherein each respective image includes a given shadow cast by the object for the corresponding respective time;

- determining respectively for each image of the plurality of images a two-dimensional (2D) silhouette of the object based on a region of the image corresponding to the given shadow;

- determining respectively for each image of the plurality of images a respective position of the light source relative to the object at the respective time; and

- based on the 2D silhouette of the object and respective position of the light source relative to the object for each respective image of the plurality of images, generating a three-dimensional (3D) object data model of the object.

| Computer Readable Medium 703 | Computer Recordable Medium 704 | Communications Medium 705 |

FIGURE 7

SYSTEMS AND METHODS FOR CAPTURING ASPECTS OF OBJECTS USING IMAGES AND SHADOWING

CROSS-REFERENCE TO RELATED APPLICATIONS

This application claims the benefit of U.S. Provisional Application No. 61/716,610 filed on Oct. 21, 2012, the entirety of which is herein incorporated by reference.

FIELD

This disclosure relates to three-dimensional (3D) modeling, and in examples, to determining a 3D model of an object based on shadows cast by the object.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for example.

Being a collection of data, 3D models can be created by hand, algorithmically, or based on data from objects that are scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

SUMMARY

In one example aspect, a method is provided that comprises receiving a plurality of images of an object casting a shadow. Each respective image of the plurality of images may correspond to a respective time of a period of time during which a light source illuminates the object over a plurality of positions. Additionally, each respective image may include a given shadow cast by the object for the corresponding respective time. The method may further include determining, by a computing device, respectively for each image of the plurality of images a two-dimensional (2D) silhouette of the object based on a region of the image corresponding to the given shadow. The method may also include determining, by the computing device, respectively for each image of the plurality of images a respective position of the light source relative to the object at the respective time. According to the method, a three-dimensional (3D) object data model of the object may be generated by the computing device based on the 2D silhouette of the object and the respective position of the light source relative to the object for each respective image of the plurality of images.

In another example aspect, a computer-readable medium having stored therein instructions that, when executed by a computing device, cause the computing device to perform functions is provided. The functions may comprise receiving a plurality of images of an object casting a shadow. Each respective image of the plurality of images may correspond to a respective time of a period of time during which a light source illuminates the object over a plurality of positions. Additionally, each respective image may include a given shadow cast by the object for the corresponding respective time. The functions may further include determining respectively for each image of the plurality of images a two-dimensional (2D) silhouette of the object based on a region of the image corresponding to the given shadow. The functions may also include determining respectively for each image of the plurality of images a respective position of the light source relative to the object at the respective time. According to the functions, a three-dimensional (3D) object data model of the object may be generated by the computing device based on the 2D silhouette of the object and the respective position of the light source relative to the object for each respective image of the plurality of images.

In another example aspect, a system is provided that comprises at least one processor and a memory. The system may also include instructions stored in the memory and executable by the at least one processor to cause the processor to perform functions. The functions may comprise receiving a plurality of images of an object casting a shadow. Each respective image of the plurality of images may correspond to a respective time of a period of time during which a light source illuminates the object over a plurality of positions. Additionally, each respective image may include a given shadow cast by the object for the corresponding respective time. The functions may further include determining respectively for each image of the plurality of images a two-dimensional (2D) silhouette of the object based on a region of the image corresponding to the given shadow. The functions may also include determining respectively for each image of the plurality of images a respective position of the light source relative to the object at the respective time. According to the functions, a three-dimensional (3D) object data model of the object may be generated by the computing device based on the 2D silhouette of the object and the respective position of the light source relative to the object for each respective image of the plurality of images.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for extracting a shape or other characteristics of an object based on shadows cast by the object. In one example, a moving light source may illuminate the object from a plurality of positions as a camera captures images of individual shadows cast by the object over a period of time. A computing device may then be configured to analyze the captured images and determine a silhouette of the object as well as a position of the light source relative to the object for each captured image. Based on the determined silhouettes and associated positions of the light source, a three-dimensional (3D) object data model of the object may be generated.

In some instances, rather than having a camera move around a fixed object to capture images of the object or an object rotate on a turntable to simulate a camera moving around the object, the motion of a light source may be used to proxy reconstruct the movement of a camera around the object.

As a specific example, a camera may be configured to capture an image of an object that is casting a shadow throughout a day (or a portion of a day). As the Sun illuminates the object from various positions over the course of the day, images of individual shadows cast by the object may be captured. Additionally, a respective time at which each image is captured may be recorded. Based on a region corresponding to the individual shadow, a silhouette of the object may be determined for each image. Also, based on the respective time at which image is captured and a geographic location of the object, a position of the Sun may be estimated for each image. Given the positions of the Sun and the corresponding silhouettes of the object, the computing device may determine a 3D object data model of the object. For instance, a visual hull approximation of the object may be determined and refined to generate the 3D object data model.

The above example is but one of many applications of methods and systems described herein. It and the other examples described herein are provided for illustrative purposes and are not intended to be limiting.

Figure 1:
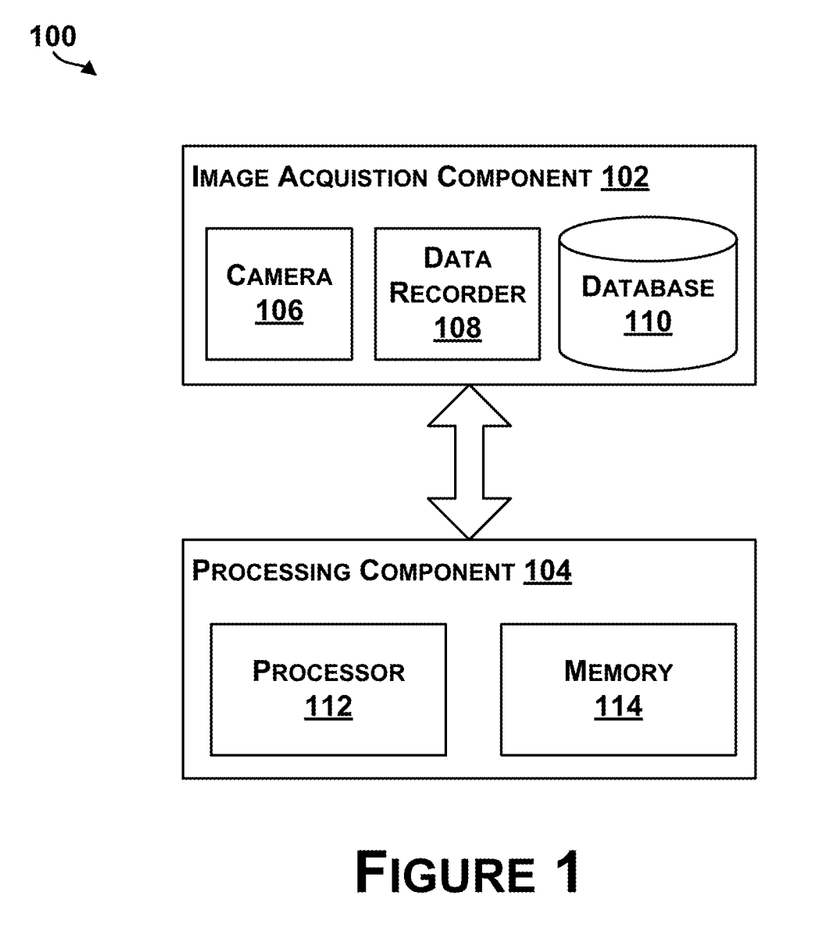
FIG. 1 illustrates an example system for determining a three-dimensional (3D) model of an object.

Referring now to the figures, FIG. 1 illustrates an example system 100 for determining a three-dimensional (3D) model of an object. As shown in FIG. 1, the system 100 includes an image acquisition component 102 and a processing component 104. In one example, the image acquisition component 102 may be configured to capture and store a plurality of images of an object casting a shadow. For instance, the image acquisition component 102 may include a camera 106 that is configured to capture images of the object at fixed intervals (e.g., once a minute) or a video of the object over a period of time. The camera 106 may include any type of imaging device such as a video camera, stereo camera, or infrared camera. In one example, the camera 106 may include a flash enabling the camera to perform high dynamic range (HDR) imaging.

Additionally, the image acquisition component 102 may include a data recorder 108 and a database 110. The data recorder 108 may be configured to determine and/or log information associated with each image captured by the camera 106. For example, the data recorder 108 may record one or any combination of a time of day, a date, ambient light conditions, light source position, geographic positioning system (GPS) coordinates, camera position, and camera orientation. In some instances, the data recorder 108 may receive data from one or more sensors or other components. For example, the data recorder 108 may receive a camera position and orientation from a camera controller that is configured to position the camera. As another example, the data recorder 108 may receive GPS coordinates form a GPS. In another example, the data recorder 108 may receive a position of the light source from a light source controller that is configured to position the light source. Data that is determined or logged by the data recorder 108 may be stored in the database 110 in association with corresponding images captured by the camera 106.

In some examples, the system 100 may be utilized to identify shadows cast by the object as the object is illuminated by a light source (not shown). The light source may illuminate the object over a plurality of positions during a period of time. As an example, the light source may be the Sun. The light source could also be a spotlight, strobe light, light emitting diode (LED) array, headlight or other realization. In an instance in which the light source is not the Sun, the light source may be moved over the plurality of positions by a motion controller, robotic arm, or other apparatus. The position of the light source may also be output by the apparatus and stored in the database 110. In another example, a second camera that is calibrated with respect to the position of the camera 106 may be used to track the position of the light source, and the position of the light source may be recorded in the database 110.

The image acquisition component 102 may be coupled to the processing component 104. In one instance, the processing component 102 may be one or more computing devices that the image acquisition component 102 is connected to via a wired or wireless connection. For example, the processing component 104 may be a server in a network with which the image acquisition component 102 is configured to operate via cloud computing. The processing component 104 may be configured to analyze images captured by the camera 106 as well as additional information stored in the database 110. Additionally, the processing component 104 may be configured to generate a 3D model of an object. A processor 112 of the processing component 104 may be configured to execute instructions stored in a memory 114 of the processing component 104. The processor 112 may include one or any combination of a variety of types of processors. Similarly, the memory 114 may include any type of memory (e.g., volatile and/or non-volatile memory).

Figure 2:
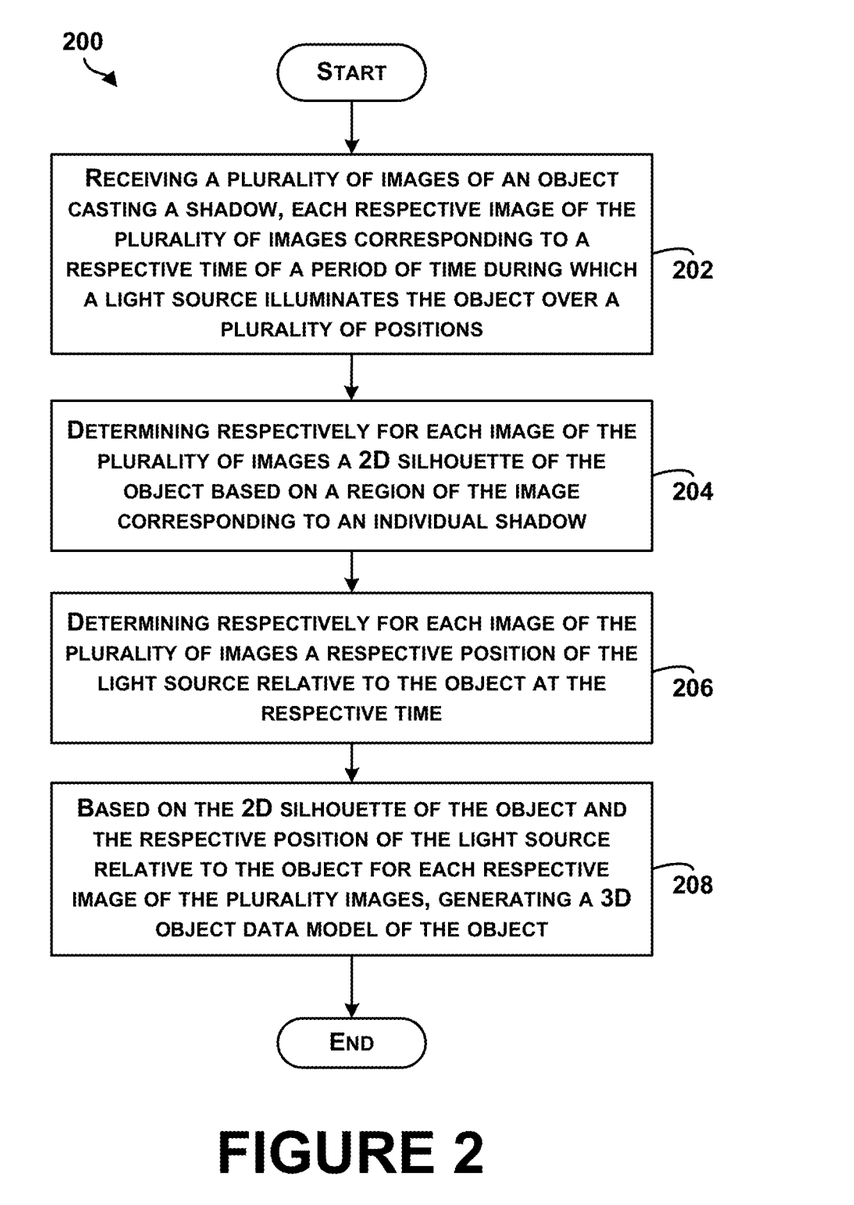
FIG. 2 is a block diagram of an example method for determining a three-dimensional (3D) model of an object.

FIG. 2 is a block diagram of an example method 200 for determining a three-dimensional (3D) model of an object. Method 200 shown in FIG. 2 presents an embodiment of a method that could be used or implemented by the system 100 of FIG. 1, for example, or by components of the system 100 in FIG. 1, or more generally by a server or other computing device. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes receiving a plurality of images of an object casting a shadow. Each respective image of the plurality of images may correspond to a respective time of a period of time during which a light source illuminates the object over a plurality of positions. Additionally, each respective image may include a given shadow cast by the object for the corresponding respective time.

In one example, a camera may be configured to capture images of a shadow cast by the object as the object is illuminated by the Sun over a portion of a day. For instance, the object may be a building, a vehicle, a statue, or other type of 3D object. The camera may capture a first image of a shadow cast by the object while the object is illuminated from a first respective position of the Sun at a first respective time. Subsequently, the camera may capture a second image of a shadow cast by the object while the object is illuminated from a second respective position at a subsequent time. As the Sun move across additional positions throughout the day, the camera may be configured to capture additional images. For example, the camera may capture an image once a minute or at other predetermined intervals.

In another example, a camera may be configured to record a video of the object as the object is illuminated by the Sun. For instance, the plurality of images may be a plurality of frames of the recorded video that are selected for analysis.

As described above, one of ordinary skill in the art will appreciate that the light source could also be a spotlight, strobe light, LED array, or other type of light source that illuminates the object over a plurality of positions during the period of time. In addition, as another example, the light source may be included within the camera (e.g., flash) and may be operated as the camera is moved to different positions to capture the images.

At block 204, the method 200 includes determining respectively for each image of the plurality of images a 2D silhouette of the object based on a region of the image corresponding to an individual shadow. For example, a region of the image corresponding to the individual shadow may be identified as the 2D silhouette.

In one example, a computing device may be configured to identify a region (or multiple regions) of interest in each image. For example, the region may be a predetermined region within a field of view of a camera in which an object appears. Alternatively, the region of interest may be a foreground or background portion of the image that is selected based on color, luminance, shot-to-shot change, or other characteristics of the plurality of images. In still another example, an operator may be configured to identify a portion of the plurality of images that includes the object as the region of interest via a user interface as the operator reviews the images.

Given the identified region of interest, the computing device may identify an individual shadow cast by the object for each image. The identification of the shadow may be performed using any of a variety of image processing techniques such as using comparison shots and/or luminance thresholds to isolate a region of an image corresponding to a shadow. In one example, the images may be color images, and a region of the image that is a shadow may be identified based on the assumption that the chromatic appearance of image regions does not change across shadow boundaries, while the intensity component of a pixel's color does. In another example, contiguous dark shapes in an image that are adjacent to a previously identified region of interest may be identified. For instance, after a contiguous shadow region has been identified in an image, frame-to-frame movement between the image and a subsequent image may be used to track the location of the shadow in the subsequent image. Other example methods for identifying a shadow in an image may also be utilized.

At block 206, the method 200 includes determining respectively for each image of the plurality of images a respective position of the light source relative to the object at the respective time. As one example, the respective position of the light source relative to the object may be determined based on geometric properties of the shadow cast by the object in one or multiple images.

For example, the reference "The geometry of point light source from shadows" by B. Hu, C. Brown, and R. Nelson describes the use of shadow geometry to identify the location of a directional light source (e.g., the Sun) based on a single view of a shadow cast by the object, and is incorporated herein by reference. In the reference, it is shown that if a shadow surface is a plane (e.g., the ground plane), the geometry of such a configuration is similar to the well-studied two-camera setting, with analogous notions of epipolar plane and epipole. The light source position is treated as a projective device just like a pinhole camera, with the planar shadow surface being its retina plane. If the light source is located at infinity (e.g., in an instance in which the light source is approximated to be a directional light source), this provides the additional constraint necessary to solve for the location of the light source.

In another instance in which the light source is the Sun, the respective position of the Sun may be estimated based on a geographic location of the object and the respective time of day. For example, if the geographic location and the time of day are known, the Sun azimuth and Sun elevation angles may be calculated for the geographic location and time of day. In one example, the geographic location of the object may be determined based on GPS coordinates received from a GPS device.

In yet another example, the direction of the light source may be determined based on the placement of a faceted test object (e.g., a mirror ball) at a known position within a scene. Based on the appearance of the faceted test object in an image (e.g., based on the location of specular highlights on the faceted test object), an estimate of the direction of the light source may be determined. For instance, specular reflection is visible where the surface normal of the faceted test object is oriented halfway between the direction of the light source and the direction of the viewer (i.e., camera viewpoint of an image).

If the position and orientation of the camera used to capture the image are also known, the position of the Sun relative to the object and the 2D silhouette may also be determined. For example, given the position and orientation of the camera with respect to a common reference frame, the 2D positions of the object and the silhouette in an image may be transformed to corresponding 3D positions in the common reference frame using known perspective projection transformations. Thus, the 3D positions of the Sun and the silhouette may be determined within a common reference frame.

In still other examples, a second calibrated camera may be used to directly observe or track the position of the light source over time. For example, the second camera may be oriented to observe the position of the light source. By analyzing images received from the second camera, the position of the light source in the received images may be determined. Subsequently, the 2D position of the light source in the image from the second camera may be transformed into a 3D position within a common reference frame based on the orientation and position of the second camera.

It is contemplated that the images of the object casting a shadow may be captured using a single position and orientation of the camera. However, this need not be the case. Alternatively, the images of the object casting a shadow may be captured from a variety of positions and orientations of the camera. As an example, a camera coupled to a vehicle having a GPS and orientation sensor (e.g., a pan/tilt actuator to which the camera is attached) may drive or fly around a monument to capture images of the object as the object is illuminated by the Sun. The GPS position and orientation of the images may be used to transform the positions of the 2D silhouette observed for each image into a 3D position within a common reference frame.

At block 208, the method 200 includes based on the 2D silhouette of the object and the respective position of the light source relative to the object for each respective image of the plurality of images, generating a 3D object data model of the object. In one example, the generated 3D object data model may be a visual hull approximation of the object. For instance, using a shape-from-silhouette reconstruction technique, a bounding geometry of the object may be found.

In shape-from-silhouette reconstruction techniques, the bounding geometry may be an approximation for the outer hull of the object as determined based on a sequence of silhouettes and associated camera viewing parameters. Typically, a 2D silhouette that defines the outline of the projection of an object from a given viewpoint or camera center onto an image plane is determined for multiple viewpoints. The determined 2D silhouette for each viewpoint along with the center of the corresponding camera is then used to define a volume (i.e., visual cone) which if backprojected to 3D space can be assumed to bound the object. The intersection of the volumes associated with each 2D silhouette then yields a visual hull approximation of the object.

In the example method 200, the camera center or viewpoint may be likened to the light source position and direction. A visual cone between each 2D silhouette and associated light source position may be found for each of the plurality of images. Based on an intersection of each of the visual cones, a visual hull approximation of the object may be determined. The visual hull approximation may also be refined using any of a variety of known refinement methods. For instance, the reference "3D reconstruction by combining shape from silhouette with stereo" by H. Lin describes a refinement technique that is available if a stereo camera is used to capture multi-view silhouette images, and is incorporated herein by reference.

In other examples, approximations of visual hulls are determined and refined based on a classification of discrete voxels within a space of interest. One of ordinary skill will appreciate that the method 200 may utilize any shape-from-silhouette technique to determine a 3D model. In other examples, the silhouette and position information of the light source may be provided to a server in a query to receive a 3D object data model, and a computing device may determine the 3D object data model by receiving the model from the server.

A conceptual example of the generation of a visual hull approximation of an object based on shadows cast by the object is further described with reference to FIGS. 3-5.

Figure 3:
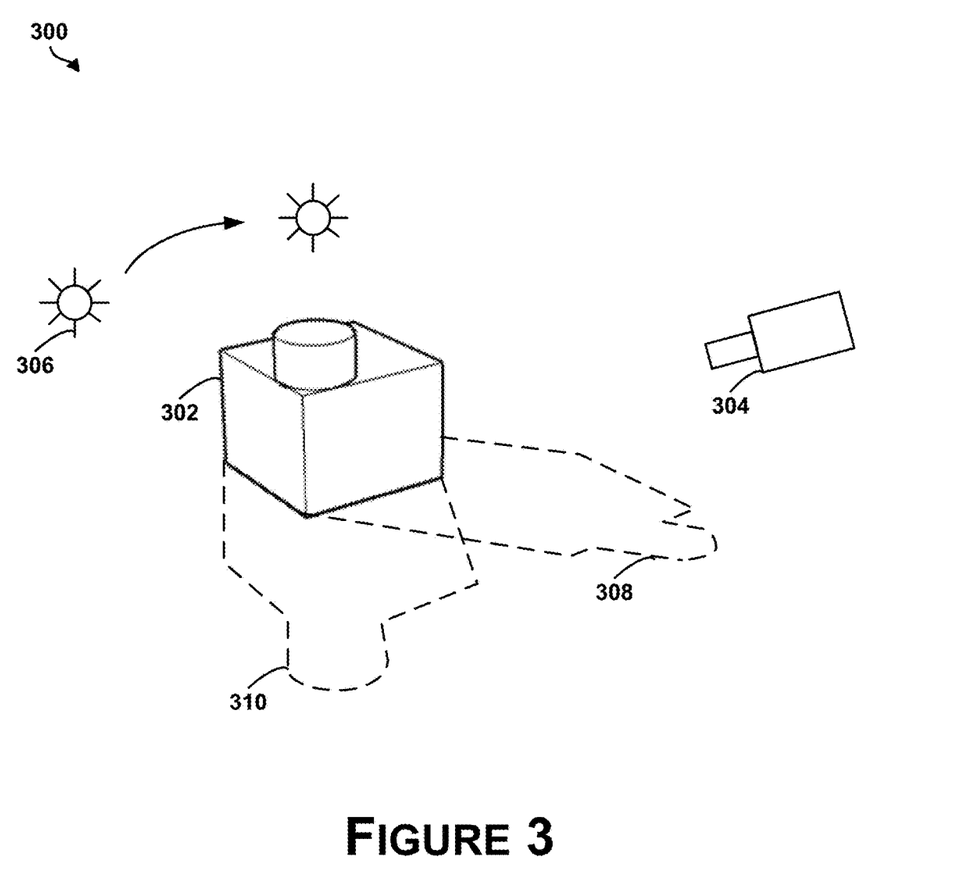
FIG. 3 is an example conceptual illustration of capturing images of shadows cast by an object.

FIG. 3 is an example conceptual illustration 300 of capturing images of shadows cast by an object 302. As shown in FIG. 3, a camera 304 may be used to capture images of the object as the object is illuminated by a light source 306. In the conceptual illustration 300, a first shadow 308 is cast by the object 302 at a first instance in time while a second shadow 310 is cast by the object 302 at a second instance in time after the light source 306 has moved to a new position.

In some examples, the camera 304 may be coupled to a fixed apparatus such as a tripod, streetlight, or building (not shown). In other examples, the camera 304 may be coupled to mobile vehicle. Images captured by the camera 304 may then be provided to a processing component or computing device that is configured to analyze the images. Similarly, although the light source 306 is depicted as the sun, the light source may be any number of other light sources and may additionally be coupled to a mobile vehicle, or coupled to the camera 304 as well.

Figure 4:
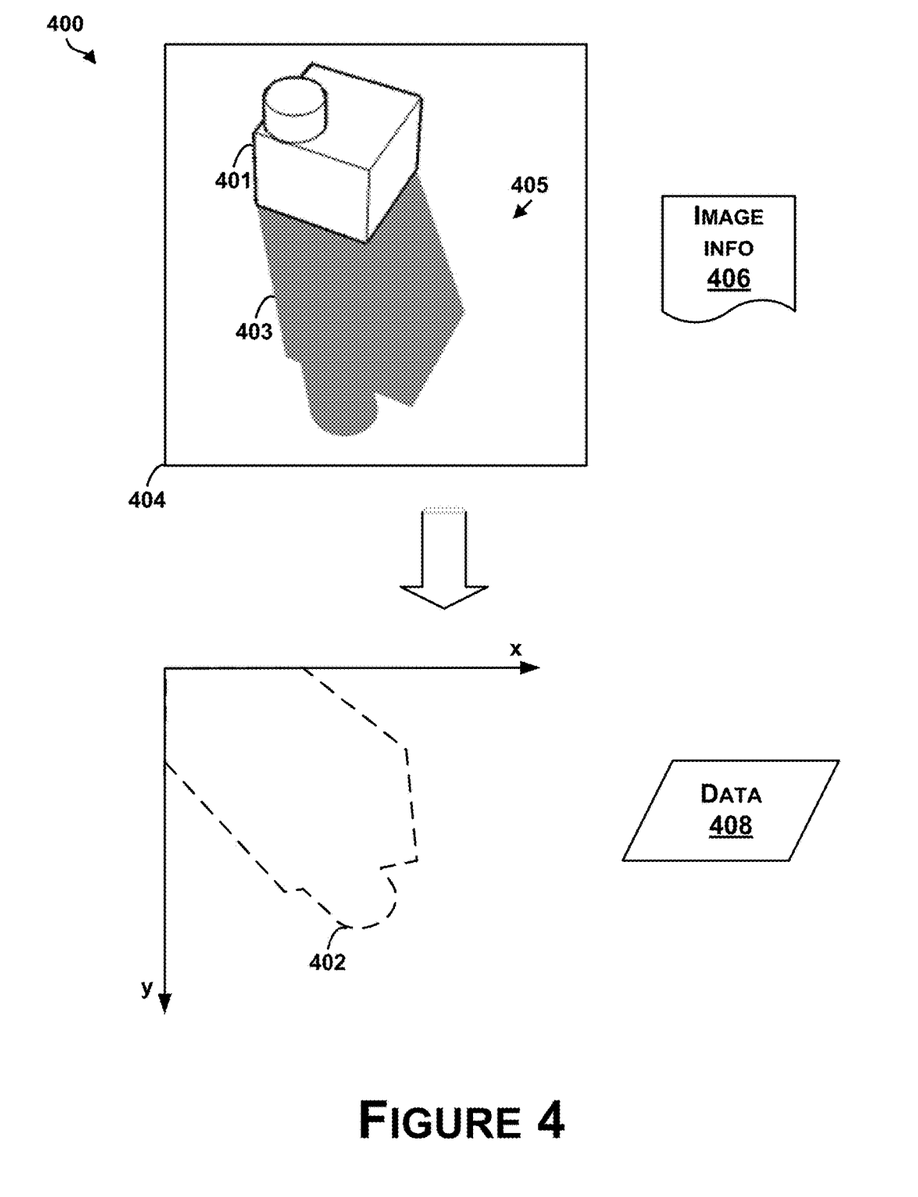
FIG. 4 is an example conceptual illustration of a two-dimensional silhouette of an object that is determined based on an image of the object.

FIG. 4 is an example conceptual illustration 400 of a two-dimensional silhouette 402 of an object that is determined based on an image 404 of the object. A computing device may receive the image 404 as one of plurality of images of the object received by the computing device. The computing device may also receive image information 406 that is associated with the image 404. For instance, the image information 406 may be metadata stored with the image that identifies one or more of a time, date, geographic location, camera orientation, and camera position.

Based on the received image 404, the computing device may identify or determine the 2D silhouette 402. As shown in FIG. 4, the 2D silhouette 402 may be defined with respect to 2D coordinate system that defines a portion of a common reference frame. In one example, the x-axis and y-axis of the 2D coordinate system may be aligned with North and East directions respectively, for example. As described above, the 2D silhouette 402 may be determined based on a region of the image 404 corresponding to an individual shadow cast by the object. Pixel positions of the region of the image 404 may then be transformed to the common reference frame to determine the 2D silhouette 402.

Determining the 2D silhouette from the shadow cast by the object may involve understanding the geometry that the object is cast on. For example, in FIG. 4, the object 401 casts a shadow 403 on a background 405, and this enables computing the silhouette 402 through projective geometry. In the example of FIG. 4, the background 405 can be computed because the background 405 is a ground plane of known orientation and distance with respect to the camera. However, in other examples, any geometry could be used as a background, such as curve, stepped planes, a table, platform, or other arbitrary configurations for which the geometry is known or computable. For instance, in one realization, the object could be placed on a background plane engineered to match a given height and orientation. In another realization, the background could be measured with a depth camera. In still another realization, the background could be computed using features extracted from the image. For instance, any known techniques for attempting to infer the existence of a ground plane from texture and vanishing point lines features of an image could be used to compute the background.

Based on an analysis of the image 404 and the image information 406, data 408 may also be determined and stored with the 2D silhouette 402. For example, the data 408 may include a determined or observed position or direction of the light source and/or information identifying the pixels of the image 404 that correspond to the identified individual shadow.

The analysis described with respect to the image 404 may be repeated for each of a plurality of images of the object. As a result, a plurality of 2D silhouettes and corresponding light source positions may be determined.

Figure 5:
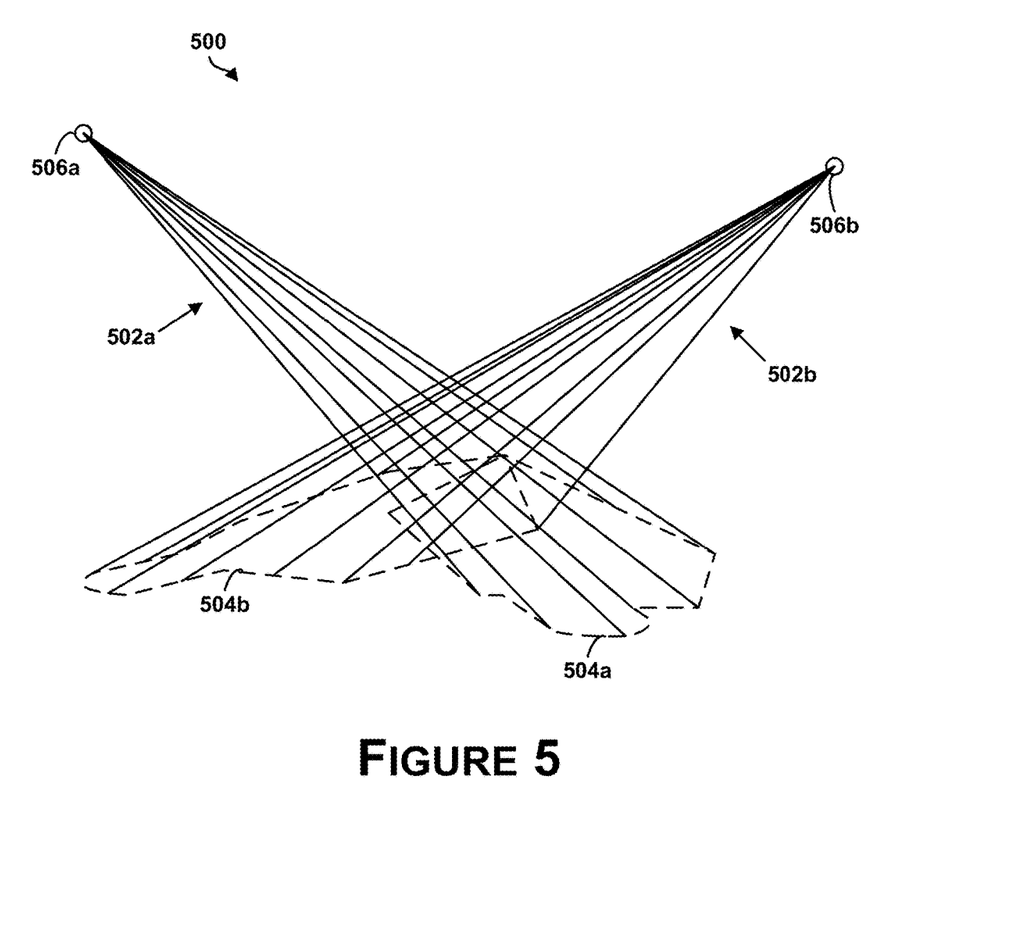
FIG. 5 is an example conceptual illustration of visual cones corresponding to each of two silhouettes of an object.

FIG. 5 is an example conceptual illustration 500 of visual cones 502a-b corresponding to each of two silhouettes of an object. A first visual cone 502a corresponds to a first 2D silhouette 504a while a second visual cone 502b corresponds to a second 2D silhouette 504b. The first visual cone 502a is a defined by a volume of space between the first 2D silhouette 504a and a first position 506a of a light source. Similarly, the second visual cone 502b is defined by a volume of space between the second 2D silhouette 504b and a second position 506b of the light source. The first visual cone 502a and the second visual cone 504b, often referred to as silhouette cones, are conceptual volumes that are useful for determining constraints that bound the outer geometry of the object. For instance, a visual cone may be defined by a number of rays between a light source position and points lying on the perimeter of a silhouette.

A visual hull approximation of the object may be found by determining a volume of space that is constrained between the first visual cone 502a and the second visual cone 502b. As the number of 2D silhouettes and associated visual cones increases, the visual hull approximation may be further constrained such that the approximation represents a shape of the object (or a portion of the object).

In other examples, a region of interest detection may be used, such as figure-to-ground processing based on luminance, movement, color, known background, etc., and then using the figure detection in the camera location as an additional constraint on the visual hull. The outline of the object with respect to the camera provides effectively another silhouette which can be combined with the silhouettes computed from the camera. For example, if an object is placed on a fixed background of know distance, orientation, and color, and the object's color can be distinguished from the background using a reference shot of an empty background or prior knowledge of the background's color or texture, then a region of the image can be identified which consists of the object, distinct from the background. This region is effectively equivalent to a silhouette, and a visual cone can be projected from the camera location to this object as in FIG. 5, providing an additional constraint on the visual hull.

Figure 6:
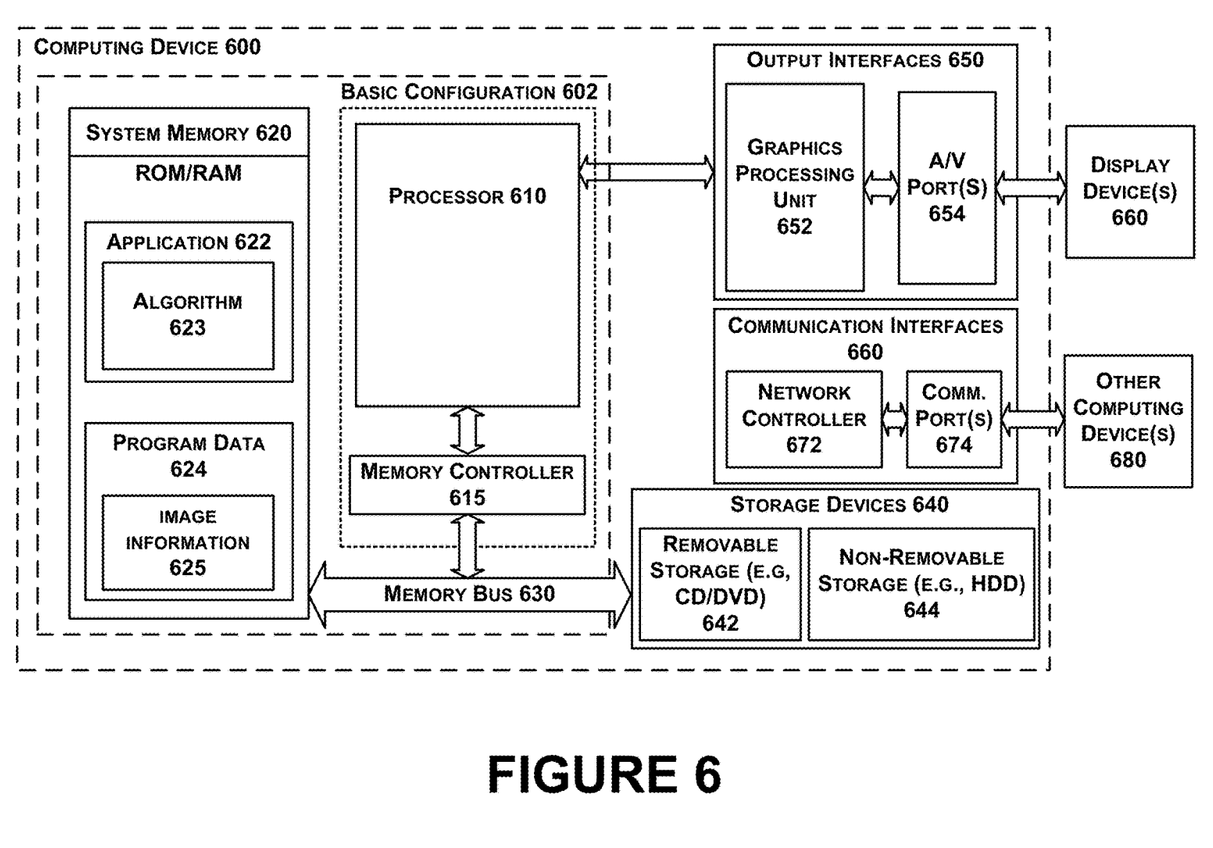
FIG. 6 is a functional block diagram illustrating an example computing device used in a computing system that is arranged in accordance with at least some embodiments described herein.

FIG. 6 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for determining a 3D model of an object as described in FIGS. 1-5. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (µP), a microcontroller (µC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include an image analysis algorithm 623 that is arranged to provide inputs to the electronic circuits, in accordance with the present disclosure. Program data 624 may include image information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include output interfaces 650 that may include a graphics processing unit 652, which can be configured to communicate to various external devices such as display devices 660 or speakers via one or more A/V ports or a communication interface 660. The communication interface 660 may include a network controller 672, which can be arranged to facilitate communications with one or more other computing devices 680 over a network communication via one or more communication ports 674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

Figure 7:
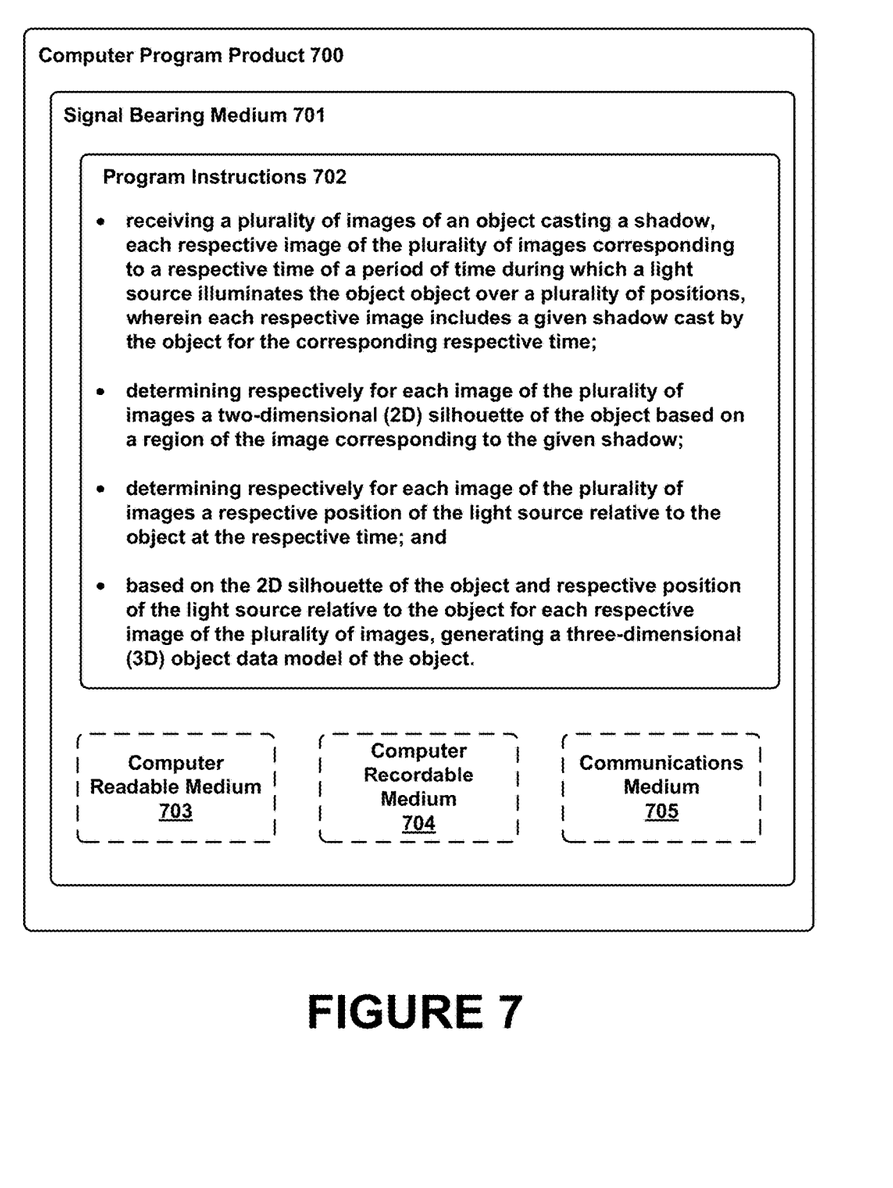
FIG. 7 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming with the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving a plurality of images of an object casting a shadow, each respective image of the plurality of images corresponding to a respective time of a period of time during which the Sun illuminates the object over a plurality of positions, wherein each respective image includes a given shadow cast by the object for the corresponding respective time, and wherein the plurality of images are captured from varying respective positions and orientations of a camera;
    determining respectively for each image of the plurality of images a geometry of a background area on which the given shadow is cast;
    determining, by a computing device, respectively for each image of the plurality of images a respective two-dimensional (2D) silhouette of the object based on a region of the image corresponding to the given shadow and the respective geometry of the background area on which the given shadow is cast;
    determining, by the computing device, respectively for each image of the plurality of images a respective position of the Sun relative to the object at the respective time based on geographic coordinates of the object, the corresponding respective time, and the respective position and orientation of the camera;
    determining respectively for each image of the plurality of images a visual cone between the respective 2D silhouette and the respective position of the Sun;
    determining for an image of the plurality of images an outline of the object;
    determining an effective visual cone between the respective position of the camera for the image and the outline of the object; and
    based on the determined visual cones and the effective visual cone, generating a three-dimensional (3D) object data model of the object.

2. The method of claim 1, wherein the plurality of images comprise a plurality of frames of a video.

3. The method of claim 1, wherein the generated 3D object data model comprises a visual hull approximation of the object.

4. The method of claim 1, wherein each respective image is captured from a respective position and orientation of the camera, and wherein the positions and orientations of the camera vary over the period of time.

5. A non-transitory computer-readable medium having stored therein instructions that, when executed by a computing device, cause the computing device to perform functions comprising:
  receiving a plurality of images of an object casting a shadow, each respective image of the plurality of images corresponding to a respective time of a period of time during which the Sun illuminates the object over a plurality of positions, wherein each respective image includes a given shadow cast by the object for the corresponding respective time, and wherein the plurality of images are captured from varying respective positions and orientations of a camera;
  determining respectively for each image of the plurality of images a geometry of a background area on which the given shadow is cast;
  determining respectively for each image of the plurality of images a respective two-dimensional (2D) silhouette of the object based on a region of the image corresponding to the given shadow and the respective geometry of the background area on which the given shadow is cast;
  determining respectively for each image of the plurality of images a respective position of the Sun relative to the object at the respective time based on geographic coordinates of the object, the corresponding respective time, and the respective position and orientation of the camera;
  determining respectively for each image of the plurality of images a visual cone between the respective 2D silhouette and the respective position of the Sun;
  determining for an image of the plurality of images an outline of the object;
  determining an effective visual cone between the respective position of the camera for the image and the outline of the object; and
  based on the determined visual cones and the effective visual cone, generating a three-dimensional (3D) object data model of the object.

6. The non-transitory computer-readable medium of claim 5, wherein the plurality of images comprise a plurality of frames of a video.

7. The non-transitory computer-readable medium of claim 5, wherein the generated 3D object data model comprises a visual hull approximation of the object.

8. A system comprising:
  at least one processor;
  a memory; and
  instructions stored in the memory and executable by the at least one processor to cause the processor to perform functions comprising:
    receiving a plurality of images of an object casting a shadow, each respective image of the plurality of images corresponding to a respective time of a period of time during which the Sun illuminates the object over a plurality of positions, wherein each respective image includes a given shadow cast by the object for the corresponding respective time, and wherein the plurality of images are captured from varying respective positions and orientations of a camera;
    determining respectively for each image of the plurality of images, a geometry of a background area on which the given shadow is cast;
    determining respectively for each image of the plurality of images a respective two-dimensional (2D) silhouette of the object based on a region of the image corresponding to the given shadow and the respective geometry of the background area on which the given shadow is cast;
    determining respectively for each image of the plurality of images a respective position of the Sun relative to the object at the respective time based on geographic coordinates of the object, the corresponding respective time, and the respective position and orientation of the camera;
    determining respectively for each image of the plurality of images a visual cone between the respective 2D silhouette and the respective position of the Sun;
    determining for an image of the plurality of images an outline of the object;
    determining an effective visual cone between the respective position of the camera for the image and the outline of the object; and
    based on the determined visual cones and the effective visual cone, generating a three-dimensional (3D) object data model of the object.

9. The system of claim 8, wherein the plurality of images comprise a plurality of frames of a video.

* * * * *